United States Patent
Fröhlich

(10) Patent No.: US 11,215,914 B2
(45) Date of Patent: Jan. 4, 2022

(54) METHOD OF MANUFACTURING A MICROPROJECTOR FOR A PROJECTION DISPLAY

(71) Applicant: DOCTER OPTICS SE, Neustadt an der Orla (DE)

(72) Inventor: Sven Fröhlich, Jena (DE)

(73) Assignee: DOCTER OPTICS SE, Neustadt an der Orla (DE)

( * ) Notice: Subject to any disclaimer, the term of this patent is extended or adjusted under 35 U.S.C. 154(b) by 132 days.

(21) Appl. No.: 16/488,492

(22) PCT Filed: Feb. 8, 2018

(86) PCT No.: PCT/EP2018/000049
§ 371 (c)(1),
(2) Date: Aug. 23, 2019

(87) PCT Pub. No.: WO2018/157964
PCT Pub. Date: Sep. 7, 2018

(65) Prior Publication Data
US 2021/0141299 A1  May 13, 2021

(30) Foreign Application Priority Data

Mar. 1, 2017 (DE) .......................... 102017001918.5
Mar. 24, 2017 (DE) .......................... 102017002946.6
Apr. 18, 2017 (DE) .......................... 102017003721.3

(51) Int. Cl.
*B29D 11/00* (2006.01)
*G03B 21/14* (2006.01)
(Continued)

(52) U.S. Cl.
CPC ...... *G03B 21/567* (2013.01); *B29D 11/00365* (2013.01); *G03B 21/208* (2013.01)

(58) Field of Classification Search
CPC .... G03B 21/208; G03B 21/14; G03B 21/142; H04N 9/3152; H04N 9/3173; B29D 11/00;
(Continued)

(56) References Cited

U.S. PATENT DOCUMENTS 5,498,444 A    3/1996  Hayes
5,707,684 A    1/1998  Hayes et al.
(Continued)

FOREIGN PATENT DOCUMENTS

AT        507640 A1      6/2010
DE    102006003310 A1    3/2007
(Continued)

OTHER PUBLICATIONS

PCT International Search Report and Written Opinion completed by the ISA/EP on May 7, 2018 and issued in connection with PCT/EP2018/000049.

(Continued)

*Primary Examiner* — Ryan D Howard
(74) *Attorney, Agent, or Firm* — Barnes & Thornburg LLP

(57) ABSTRACT

The invention relates to a method of manufacturing a microprojector for a projection display, wherein the microprojector comprises a support on which a projector lens array with a plurality of projector lenses is arranged, wherein on a side of the support facing away from the projector lens array, an object structure array with a plurality of e.g. identical object structures is arranged, wherein at least one projector lens is associated with one object structure such that the projections of the object structures superpose through the projector lenses to form a full image, wherein e.g. the distance between a projector lens and the associated object structures corresponds to the focal length of the (Continued)

respective projector lens, wherein on the object structure array, a condenser lens array is arranged such that in case of an illumination of the condenser lens array, a Köhler illumination of the object structures or projector lens associated with the respective condenser lenses is permitted.

26 Claims, 3 Drawing Sheets

(51) Int. Cl.
  *B33Y 80/00* (2015.01)
  *G03B 21/56* (2006.01)
  *G03B 21/20* (2006.01)
(58) Field of Classification Search
  CPC .. B29D 11/00278; B33Y 80/00; G02B 3/0012
  See application file for complete search history.

(56) References Cited

U.S. PATENT DOCUMENTS

| | | | |
|---|---|---|---|
| 8,777,424 B2 | 7/2014 | Schreiber et al. | |
| 2002/0105080 A1 | 8/2002 | Speakman | |
| 2006/0158482 A1 | 7/2006 | Nakamura et al. | |
| 2008/0310160 A1 | 12/2008 | Kim et al. | |
| 2011/0228231 A1* | 9/2011 | Schreiber | G02B 3/0056 353/31 |
| 2013/0286073 A1 | 10/2013 | Blessing et al. | |

FOREIGN PATENT DOCUMENTS

| | | |
|---|---|---|
| DE | 102009008997 A1 | 11/2010 |
| DE | 102009024894 A1 | 12/2010 |
| DE | 102011076083 A1 | 11/2012 |
| DE | 102013021795 A1 | 6/2015 |
| EP | 1411376 A1 | 4/2004 |
| EP | 2159040 A1 | 3/2010 |
| WO | 1999019900 A1 | 4/1999 |
| WO | 2004070438 A1 | 8/2004 |
| WO | 2014167119 A2 | 10/2014 |
| WO | 2016003275 A1 | 1/2016 |
| WO | 2018154090 A1 | 8/2018 |

OTHER PUBLICATIONS (German language) Office Action dated Dec. 6, 2017 and issued in connection with German Patent Appln. No 102017003721.3.
W. Royall Cox, Ting Chen, Donald J. Hayes, Michael E. Grove: „Low-cost fiber collimation for MOEMS switches by ink-jet printing, MOEMS and Miniaturized Systems II, M. Edward Motamedi, Rolf Göring, Editors, Proceedings of SPIE vol. 4561 (2001), p. 93-101.
Y. Sung et al., Journal of Biomedical Optics 20 (2015) (incorporated by reference in its entirety, book reference made available by request).
Handbook of Optical Systems—vol. 1: Fundamentals of Technical Optics, Herbert Gross, WILEY-VCH Verlag GmbH & Co KGaA, 2005, ISBN-13 978-3-40377-6 (Book reference made available by request).
International Preliminary Report on Patentability dated Sep. 12, 2019 and issued in connection with PCT/EP2018/000049.
Office Action dated Dec. 6, 2017 and issued in connection with German Patent Appln. No. 102017003721.3.
Y. Sung et al., Journal of Biomedical Optics 20 (2015) (incorporated by reference in its entirety).
Hans J. Paus: „Physik in Experimenten und Beispielen (Carl Hanser Verlag GmbH & Co. KG; Auflage: 3., aktualisierte Auflage (Apr. 4, 2007), ISBN-10: 3446411429, ISBN-13: 978-344641142) S. 200-202.
Wilhelm Kulisch: „Physik für Dummies (John Wiley & Sons, 2014—1112 Seiten), S.232.

\* cited by examiner

METHOD OF MANUFACTURING A MICROPROJECTOR FOR A PROJECTION DISPLAY

CROSS-REFERENCE TO RELATED APPLICATIONS

This application is a U.S. national counterpart application of international application serial No. PCT/EP2018/000049, filed Feb. 8, 2018, which claims priority to German Patent Application Nos. 102017001918.5, 102017002946.6, and 102017003721.3 filed Mar. 1, 2017, Mar. 24, 2017, and Apr. 18, 2017 (respectively).

BACKGROUND

The present disclosure relates to a method of manufacturing a microprojector for a projection display, in particular, an integrated microprojector.

SUMMARY

It is suggested to print individual lenses of a microprojector, e.g. a microprojector with one or several ones of the above-mentioned features (by means of a 3D printing method or by means of a printing method, e.g. 3D-inkjet printing).

DETAILED DESCRIPTION

Embodiments

Figure 1:
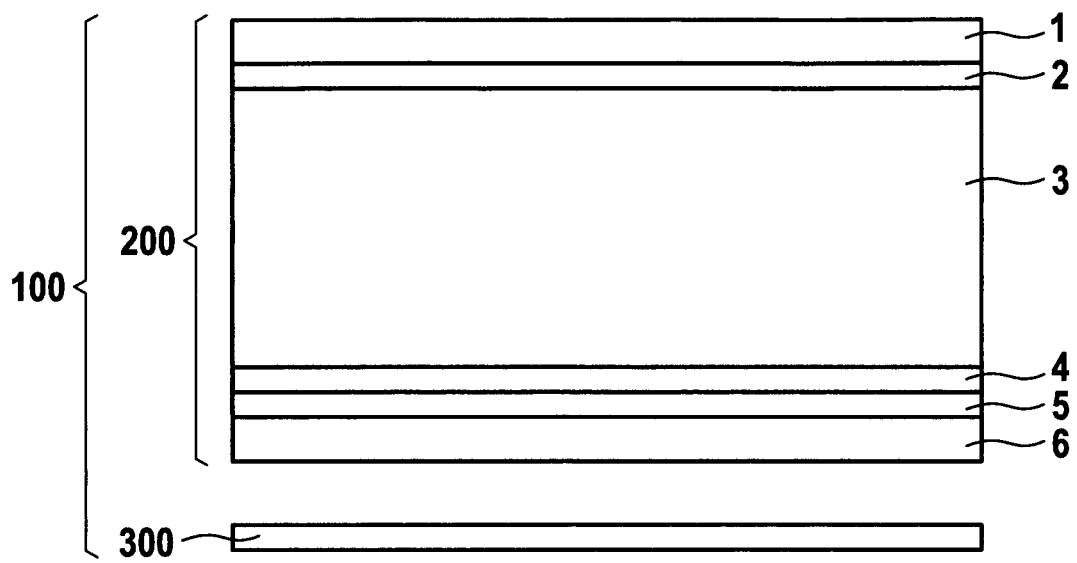
FIG. 1 shows a basic structure of a projection display.

A manufactured e.g. microprojector e.g. comprises a support on which a projector lens array with a plurality of projector lenses is arranged, wherein on a side of the support facing away from the projector lens array, an object structure array with a plurality of e.g. identical object structures is arranged, wherein at least one projector lens is associated with one object structure such that the projections of the object structures superpose through the projector lenses to form a full image, wherein e.g. the distance between a projector lens and the associated object structure corresponds to the focal length of the respective projector lenses, wherein a condenser lens array is arranged on the object structure array such that, in case of an illumination of the condenser lens array, a Köhler illumination of the object structures or projector lenses associated with the respective condenser lenses is permitted.

Here, printing is effected e.g. with a hybrid polymer "ink". As an ink, Omocer is e.g. provided. As starting material of the ink, e.g. inorganic-organic hybrid polymers, so-called Omocers, are provided. These are mixed with a solvent, depending on the marginal conditions of the printing method, to adjust the viscosity of the ink. E.g., several droplets are printed onto one point to build up a drop (microlens after its curation) which consists of several droplets or comprises several droplets. With the terminology of this disclosure, a droplet is a portion of ink exiting from a print head. One drop is the volume of ink building up on a support, such as a substrate or a coated substrate, if several droplets are printed onto one point. Reference is hereby made to the article, W. Royall Cox, Ting Chen, Donald J. Hayes, Michael E. Grove: "Low-cost fiber collimation for MOEMS switches by ink-jet printing", MOEMS and Miniaturized Systems II, M. Edward Motamedi, Rolf Göring, Editors, Proceedings of SPIE Vol. 4561 (2001), p. 93-101, for disclosure relating to printing methods, which article is hereby incorporated by reference in its entirety herein. Here, it is e.g. provided that the drops or the microlenses formed from the drops do not touch each other. Reference is hereby made to DE 10 2009 024 894 A1 for disclosure relating to microprojectors and methods of manufacturing the same, which application is hereby incorporated in its entirety herein.

E.g., the microlenses built up from the droplets are customized. That means e.g. that at least two, however e.g. several microlenses (e.g. of a microprojector) differ from each other. Here, e.g. corresponding microlenses of different microprojectors of one batch differ from each other. For example, the microlens with the coordinates i,j (i. column from the left, therein, j. projector lens from the top) of a first microprojector (of a batch) may be formed of a different number of droplets than a microlens with the coordinates i,j of a second microprojector (of the batch). E.g., the number of droplets for one microlens is individually controlled or selected or calculated or determined, respectively. The term microlens relates to projector lenses or to projector lenses and condenser lenses.

In one embodiment, a substrate (the terms "substrate" and "support" are used as synonyms in this disclosure) is provided. The optical useful layer, i.e. the object to be imaged (=structure to be imaged), is directly or indirectly applied onto the substrate. E.g., the side of the substrate with the objects to be imaged (=structure to be imaged) and/or its side of the substrate facing away is coated. Such coatings are suggested, for example, in DE 10 2013 021 795 A1 and WO99/19900. As, for example, in WO99/19900 (incorporated by reference in its entirety), US 2006/0158482 A1 (incorporated by reference in its entirety), or WO 2004/070438 A1 (incorporated by reference in its entirety), coating islands may be provided instead of a continuous coating. At least two coating islands may differ in their material and/or in their geometry (e.g. their diameter). A suited material is e.g. selected such that it permits the wetting properties of the selected material for the coating island, the building of a desired microlens or a desired drop by suited wetting properties. Reference is hereby made to "Handbook of Optical Systems—Volume 1: Fundamentals of Technical Optics", Herbert Gross, WILEY-VCH Verlag GmbH & Co. KGaA, 2005, ISBN-13 978-3-40377-6, WO99/19900, and WO 2004/070438 A1 for disclosure relating to adjusting the shape of a drop or a corresponding microlens, which references are hereby incorporated in their entirety herein. The size or the shape of the microlens or the drop may be adjusted by the number of droplets (and optionally by the wetting properties (of the ink and the solvent content)). E.g., the support is heated. Reference is hereby made to Y. Sung et al., Journal of Biomedical Optics 20 (2015), for disclosure relating to adjustment of the size or shape of the microlens, which reference is hereby incorporated in its entirety herein.

Corrected desired optical parameters of the microlens are e.g. calculated depending on the desired optical parameters and depending on (measured) properties of the coating island, such as the coating thickness. An optical parameter may be, for example, the focal length. From the corrected desired optical parameters, the number of droplets printed onto one point to produce a microlens or a drop are determined, for example, by means of a suited characteristic, as it is disclosed, for example, in W. Royall Cox, Ting Chen, Donald J. Hayes, Michael E. Grove: "Low-cost fiber collimation for MOEMS switches by ink-jet printing", MOEMS and Miniaturized Systems II, M. Edward Motamedi, Rolf Göring, Editors, Proceedings of SPIE Vol. 4561 (2001), p. 93-101 (see therein FIG. 11). Suited methods for adjusting the drop shape or the corresponding microlens (=drop) are disclosed in W. Royall Cox, Ting Chen, Donald J. Hayes, Michael E. Grove: "Low-cost fiber collimation for MOEMS switches by ink-jet printing", MOEMS and Miniaturized Systems II, M. Edward Motamedi, Rolf Göring, Editors, Proceedings of SPIE Vol. 4561 (2001), p. 93-101 (incorporated by reference in its entirety), U.S. Pat. No. 5,498,444 (incorporated by reference in its entirety), and U.S. Pat. No. 5,707,684 (incorporated by reference in its entirety).

The number of droplets may also be determined directly, and not initially indirectly, depending on the desired (optical) parameters and depending on (measured) properties of the coating island, such as the layer thickness. In this case, the characteristic is replaced by a characteristic field.

A characteristic or a characteristic field may be implemented as a table, a look-up table, a neuronal network, and/or a (numerical) function, such as e.g.

$$V^*_{KORR}(\Delta S, \Delta d) = \frac{h^2 \pi}{3}(3R - h)$$

with $$h = R - \sqrt{R^2 - \frac{(d^* + \Delta d)^2}{4}}$$

and $$R = \frac{(S + \Delta S)(n_S - n)}{n_S}$$

Herein
S* is the desired value of the support
ΔS* is the deviation of the actual value of the thickness of the support from the desired value of the thickness of the support
$N_s$ is the index of refraction of the material of the microlens
n is the index of refraction of air
d* is the desired value of the diameter of the coating island onto which the microlens is printed, or the desired value of the diameter of the base of the microlens,
Δd is the deviation of the actual value of the diameter of the coating island onto which the microlens is printed, from the diameter of the coating island onto which the microlens is printed.

E.g., the drop (=microlens) is exposed immediately or later, after the application of the desired number of droplets, for example by UV radiation. In this manner, curing is achieved. The described method is e.g. applied to both sides of the substrate. However, it is also possible to only print the projector lenses, not, however, the condenser lenses. A hybrid method may be provided in which the condenser lenses are embossed (e.g. by UV molding), and the projector lenses are printed.

In a further embodiment, the objects to be imaged are modifiable or individually controllable. In this manner, different projection patterns may be achieved (see DE 10 2009 024 894 A1). For example, an arrow may be projected in front of a motor vehicle which points either to the left or to the right, depending on how the objects that are imaged are controlled. The projection pattern and thus the control of the objects may also be adjusted in response to the key or the ignition key of a motor vehicle. That means, the user of the one key obtains a different projection from that of the user of another key.

A microlens in the sense of the disclosure is e.g. a lens whose diameter is smaller than 1 mm. Printing on a point or on one point is to include e.g., in the sense of the disclosure, that printing is effected exactly on this point, or that printing is at least effected in the region where the microlens is to be formed. A batch of microprojectors in the sense of the disclosure is e.g. a quantity of microprojectors made from one wafer. A batch of microprojectors may also be, in the sense of the disclosure, a quantity of microprojectors made from wafers of one wafer batch.

FIG. 1 shows a basic structure of a projection display 100. The projection display 100 comprises a microprojector 200 and a light source 300 for illuminating the microprojector 200. The microprojector 200 comprises a substrate 3 or a support on which a coating layer 2 may be arranged. On the coating layer 2, or on the substrate 3 directly, a projector lens layer 1 is arranged. On the side of the substrate 3 facing away from the projector layer 1, an object layer 4 with object structures to be imaged is arranged. On the object layer 4, a coating layer 5 is optionally arranged, and thereon, a condenser lens layer 6 is arranged. The condenser lens layer 6 may also be directly arranged on the object layer 4.

Figure 2:
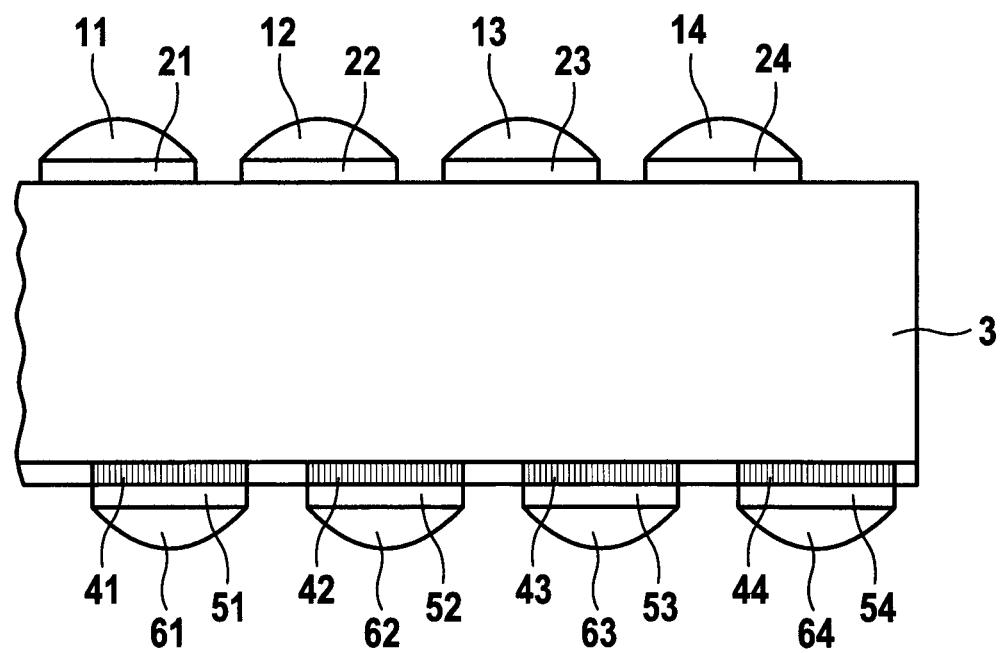
FIG. 2 shows an exemplified embodiment of a microprojector.

FIG. 2 shows an exemplified embodiment of a microprojector. Here, coating islands 21, 22, 23, 24 are arranged on a substrate 3. On the coating islands 21, 22, 23, 24, microlenses 11, 12, 13, 14, e.g. of hybrid polymer, are in turn arranged. The projector lenses 11, 12, 13, 14 are part of a projector lens array. On the side of the substrate facing away from the projector lens array, object structures 41, 42, 43, 44 are arranged which are imaged by means of the projector lens array or by means of the projector lenses 11, 12, 13, 14. Thus, the projector lens 11 images the object structure 41, the projector lens 12 images the object structure 42, the projector lens 13 images the object structure 43, and the projector lens 14 images the object structure 44. In this sense, the projector lens 11 and the object structure 41 form an optical channel, the projector lens 12 and the object structure 42 form an optical channel, the projector lens 13 and the object structure 43 form an optical channel, and the projector lens 14 and the object structure 44 form an optical channel.

On the object structures 41, 42, 43, 44, one coating 51, 52, 53, 54 each is optionally provided. On the optional coating islands 51, 52, 53, 54, a condenser lens array with condenser lenses 61, 62, 63, 64 is arranged. The condenser lenses 61, 62, 63, 64 are e.g. made of hybrid polymer material.

By means of the condenser lens array, a Köhler illumination pattern is implemented.

Figure 3:
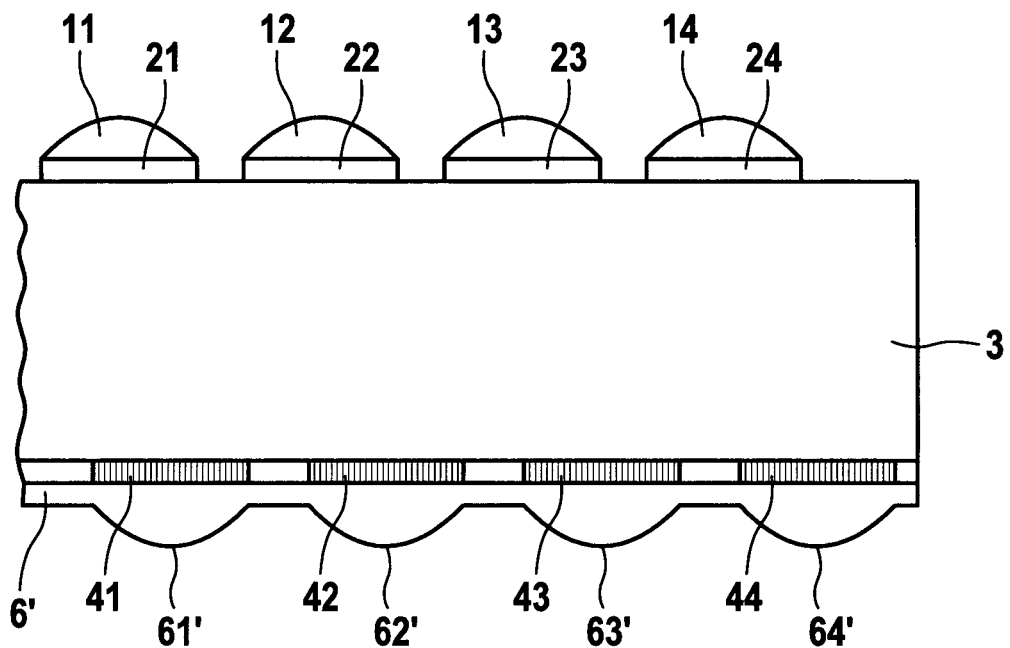
FIG. 3 shows a further exemplified embodiment of a microprojector.

FIG. 3 shows a further exemplified embodiment of a microprojector. In variation to the exemplified embodiment according to FIG. 2, here a condenser lens array layer 6' is arranged on the object structures 41, 42, 43, 44 which comprises condenser lenses 61', 62', 63', 64', or into which condenser lenses 61', 62', 63', 64 are embossed.

Figure 4:
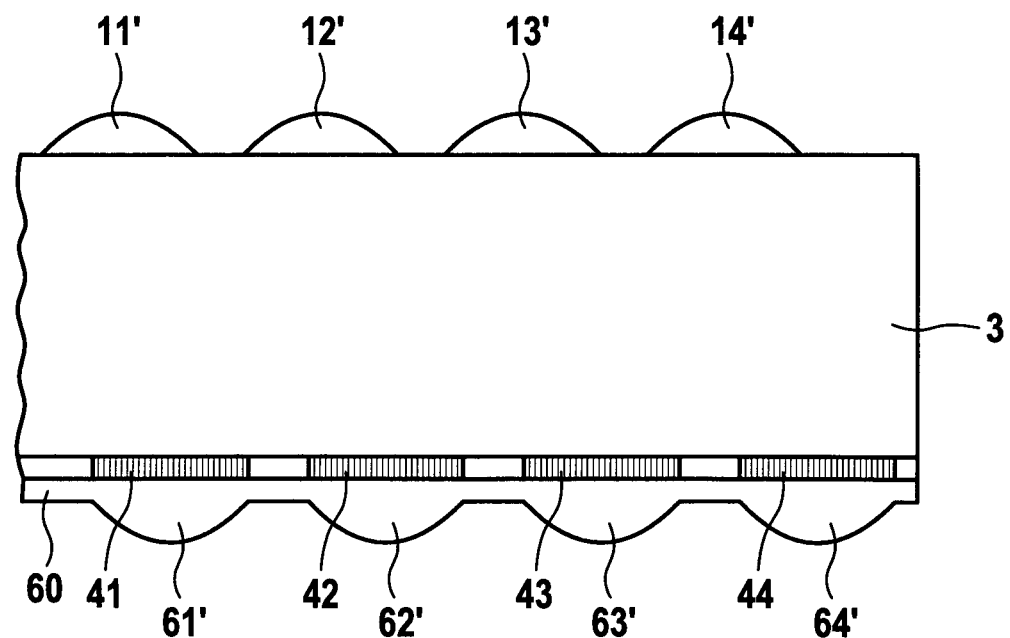
FIG. 4 shows a further exemplified embodiment of a microprojector.

FIG. 4 shows a further alternative exemplified embodiment of a microprojector. Here, in variation to the microprojector in FIG. 3, the projector lenses 11', 12', 13' and 14' are printed directly onto the substrate 3, wherein, however, the surface of the substrate 3 underneath the projector lenses 11', 12', 13' and 14' is modified or heated in the sense of a suited wetting capacity (cf. Y. Sung et al., Journal of Biomedical Optics 20 (2015) (incorporated by reference in its entirety).

Figure 5:
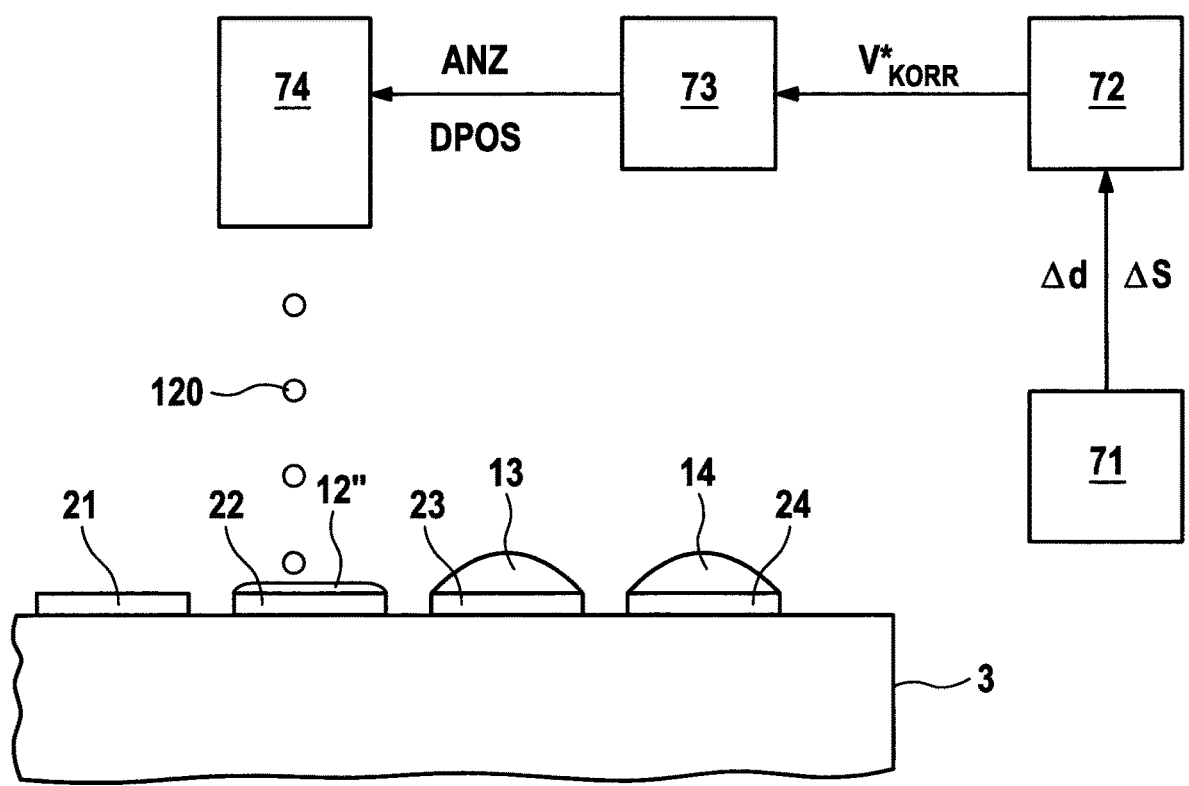
FIG. 5 shows an exemplified embodiment of a method of manufacturing a microprojector.

For the manufacture of the microlens projector, the projector lenses 11, 12, 13 and 14, as shown in FIG. 5 by way of example, are printed onto the support 3 or onto the coating 21, 22, 23, 24, respectively. To this end, a plurality of droplets 120 is printed onto one point by means of a print head 74, so that the droplets 120 join in their liquid state and form a drop mass 12' which grows, by further addition of droplets, into a drop which will form the corresponding projector lens after curing, in this case the projector lens 12. To this end, the print head 74 obtains, from a printer driver 73, information on the number ANZ of droplets 120 to be printed and a position indication DPOS to indicate the position where the droplets 120 are to be placed. E.g., the number of droplets 120 depends on the actual value of the thickness of the substrate 3 or the deviation $\Delta S$ of the actual value of the thickness of the substrate 3 (measured directly or with another wafer of the same batch) from its desired value S* and/or the actual value of the diameter d of the coating islands 21, 22, 23, 24 or the deviation $\Delta d$ of the diameter of the coating islands 21, 22, 23, 24 from their desired value d*. E.g., the thickness of the substrate 3 also comprises the thickness of the respective coating 21, 22, 23, 24.

E.g., by means of a sensor arrangement 71, the corresponding actual values or deviations $\Delta d$, $\Delta S$ are measured and supplied to a correction module 72 which outputs a corrected desired volume V*$_{KORR}$ to the printer driver 73. To this end, the correction module 72 comprises a corresponding characteristic or calculates e.g. the corrected desired volume V*$_{KORR}$ as follows:

$$V^*_{KORR}(\Delta S, \Delta d) = \frac{h^2 \pi}{3}(3R - h)$$

with $$h = R - \sqrt{R^2 - \frac{(d^* + \Delta d)^2}{4}}$$

and $$R = \frac{(S + \Delta S + \Delta f^*)(n_S - n)}{n_S}$$

Here, $\Delta f^*$ is the desired value for a defocussing of the object structure associated with the projector lens.

E.g., a plurality of microprojectors are produced on one wafer which are, upon completion of the microprojectors, separated such that the finished microprojectors are formed.

The present disclosure provides for an improved production of microprojectors.

The present disclosure relates to a method of manufacturing a microprojector for a projection display, in particular, an integrated microprojector. DE 10 2009 024 894 A1 (cf. e.g. FIG. 1/FIG. 2 according to DE 10 2009 024 894 A1), U.S. Pat. No. 8,777,424 B2 (incorporated by reference in its entirety), and DE 10 2011 076 083 A1 (incorporated by reference in its entirety) provide disclosure relating to microprojectors. The arrangement suggested in DE 10 2009 024 894 A1 consists of a regular arrangement of a plurality of condenser lenses, identical structures to be imaged and projector lenses. A light source illuminates a condenser lens array in the direct proximity of which an array of imaging structures is located.

The respective object to be projected (imaging structure) is located in the focal length of the associated lens of the projector lens array. The corresponding condenser lens is located very close to the object, compared to the distance of the projector lens to the object, to ensure a Köhler illumination of the projector lens. The projector lens array according to DE 10 2009 024 894 A1 (incorporated by reference in its entirety) forms a superposition of all individual frames on a screen. By using microlenses in a regular arrangement as projection lenses in a multi-channel architecture, it is possible according to DE 10 2009 024 894 A1 to reduce the overall length of the total system compared to conventional single-channel projectors of the same image brightness. While the small overall length of the microprojector results from the focal lengths of the lenses of only a few millimetres, the object area multiplication according to DE 10 2009 024 894 A1 provides a proportional increase of image brightness.

By a slightly reduced centre-to-centre spacing (pitch) of the projector lenses with respect to the imaging structures, an offset of the respective object and the corresponding projector optics increasing from the array's centre to the outside results. The thus formed slight tilt of the optical axes of outer projectors with respect to the central channel provides a superposition of the real individual images in a finite distance D onto the projected area provided for projection.

According to DE 10 2009 024 894 A1, the projection distance D of the microprojector results from the focal length f of the projector lens, the centre-to-centre spacing of the projector optics $P_{PL}$, and the centre-to-centre spacing of the images $P_{BL}$ (cf. FIG. 3 according to DE 10 2009 024 894 A1):

$$D = \frac{f * P_{PL}}{P_{BL} - P_{PL}}$$

The enlargement M of the microprojector results from the ratio of the projection distance D to the focal length f of the projector lens:

$$M = \frac{D}{f} = \frac{P_{PL}}{P_{BL} - P_{PL}}$$

The projection display generates, according to DE 10 2009 024 894 A1, a two-dimensional projection onto a projected area, wherein in DE 10 2009 024 894 A1, identical objects are projected. By the superposition of the projections of projector lenses with Köhler illumination, the microprojector according to DE 10 2009 024 894 A1 achieves the homogenisation of the light source in parallel to the projection.

The maximum opening angle of the light source must not exceed the acceptance angle of the condenser lens under which the exit pupil of the projector lens is completely illuminated, as otherwise, according to DE 10 2009 024 894 A1, parasitic images adjacent to the actual image can form. As an illumination, according to DE 10 2009 024 894 A1, e.g. very flat units, similar to the lightings of transmissive displays from behind (US 2008/0310160 A1), with adapted outcoupling structures may be used. The acceptance angle of peripheral individual projectors of the microprojector is, according to DE 10 2009 024 894 A1, restricted by the telecentric emission characteristic of the source compared to the central projector channel. An additional macroscopic condenser lens, e.g. in the form of a thin Fresnel lens, may annul this telecentrics according to DE 10 2009 024 894 A1 and thus, according to DE 10 2009 024 894 A1, further increase the overall brightness of the projection (FIG. 4 according to DE 10 2009 024 894 A1).

The application of suited light-conducting elements, e.g. concentrators as a part of the condenser lens array, may, according to DE 10 2009 024 894 A1, block the dead zones between the condenser lenses and thus significantly increase the filling factor (FIG. 5 according to DE 10 2009 024 894 A1). The use of so-called "chirped" lens arrays, i.e. lens arrays with parameters continuously variable over the array (e.g. different focal lengths of the projector lenses over the array or different focal lengths tangentially and sagitally by designing them as elliptical lenses) may provide a correction of the defocus and the astigmatism of the peripheral projection patterns.

To suppress the influence of the distortion both of the individual channel and the superposition of all imaging channels, according to DE 10 2009 024 894 A1, a channel-wise pre-distortion of the imaging structures is possible. The use of microlenses with short focal lengths is connected, according to DE 10 2009 024 894 A1, with a restriction of the transferable information. The representable image resolution is, according to DE 10 2009 024 894 A1, restricted by the superposition of aberrations and diffraction effects. An increase of the overall information transmission is, according to DE 10 2009 024 894 A1, possible by segmenting the projection image and assigning defined areas of the field of view to groups of individual projectors in a crossed arrangement within a microprojector (cf. FIG. 6/FIG. 7 according to DE 10 2009 024 894 A1). A full-colour projection is enabled, according to DE 10 2009 024 894 A1, by interlacing three array projection displays according to DE 10 2009 024 894 A1, each representing one primary colour proportion of the image to be projected in the form of identical object structures (cf. FIG. 8/FIG. 9 according to DE 10 2009 024 894 A1). Furthermore, according to DE 10 2009 024 894 A1, a channel-wise chromatic error correction is possible which, compared to conventional single-channel projection systems with complex achromatised multi-lens projection lenses, represents a drastic simplification of the projection optics. If the object structure is generated by a digital imager that depicts, as image contents, an array of identical images in a variable pitch, the microprojector enables the representation of dynamic image contents.

By an electronic offset of the individual frames on the imager, according to DE 10 2009 024 894 A1, the projection distance may be controlled without mechanical components (see formula above for the projection distance D). In combination with a measurement of the distance to the projected area, according to DE 10 2009 024 894 A1, the projection distance may thus be electronically traced within a control loop. The imager may be, according to DE 10 2009 024 894 A1, e.g. a transmissive LCD display (cf. FIG. 10 according to DE 10 2009 024 894 A1).

The invention claimed is:

1. Method of manufacturing a batch comprising a first microprojector and a second microprojector, the method comprising:
providing a transparent support;
arranging a first object structure array on the transparent support, the first object structure array comprising a first plurality of identical object structures associated with the first microprojector;
arranging a second object structure array on the transparent support, the second object structure array comprising a second plurality of identical object structures associated with the second microprojector;
arranging a first projector lens array on a side of the support facing away from the first object structure array, wherein at least one projector lens of the first projector lens array is associated with one object structure of the first object structure array such that the projections of the object structures of the first object structure array superpose through the projector lenses of the first projector lens array to form a first full image, wherein the projector lenses of the first projector lens array are printed by means of transparent ink from a plurality of droplets which, in their liquid state, join into a drop which forms a projector lens the first projector lens array after curing;
arranging a second projector lens array on a side of the support facing away from the second object structure array, wherein at least one projector lens of the second projector lens array is associated with one object structure of the second object structure array such that the projections of the object structures of the second object structure array superpose through the projector lenses of the second projector lens array to form a second full image, wherein the projector lenses of the second projector lens array are printed by means of transparent ink from a plurality of droplets which, in their liquid state, join into a drop which forms a projector lens the second projector lens array after curing, wherein a $i^{th}$ column and $j^{th}$ row projector lens of the second microprojector of the batch being formed of a different number of droplets than the $i^{th}$ column and $j^{th}$ row projector lens of the first microprojector of the batch;
curing the drops forming the projector lenses of the first projector lens array;
curing the drops forming the projector lenses of the second projector lens array; and
separating the first microprojector and the second microprojector.

2. Method according to claim 1, wherein the number of droplets for printing a projector lens is determined in response to the thickness of the support.

3. Method according to claim 2, the method further comprising:
arranging a condenser lens array on the first object structure array, the condenser lens array comprising a plurality of condenser lenses, wherein the condenser lenses are printed by means of a transparent ink from a plurality of droplets which, in their liquid state, join into a drop which forms a condenser lens after curing; and
curing the drops which form the condenser lenses.

4. Method according to claim 1, wherein the number of droplets for printing a projector lens is determined in response to the thickness' deviation from a desired value of the thickness of the support.

5. Method according to claim 4, the method further comprising:
arranging a first condenser lens array on the first object structure array, the first condenser lens array comprising a plurality of condenser lenses, wherein the condenser lenses are printed by means of a transparent ink from a plurality of droplets which, in their liquid state, join into a drop which forms a condenser lens after curing; and
curing the drops which form the condenser lenses of the first condenser lens array.

6. Method according to claim 5, the method further comprising:
arranging a second condenser lens array on the second object structure array, the second condenser lens array comprising a plurality of condenser lenses, wherein the condenser lenses are printed by means of a transparent ink from a plurality of droplets which, in their liquid state, join into a drop which forms a condenser lens after curing; and
curing the drops which form the condenser lenses of the second condenser lens array.

7. Method according to claim 6, characterized in that the transparent ink comprises a hybrid polymer.

8. Method of manufacturing a microprojector, the method comprising:
providing a transparent support;
arranging an object structure array on the transparent support, the object structure array comprising a plurality of object structures;
arranging a projector lens array on a side of the support facing away from the object structure, wherein at least one projector lens is associated with one object structure such that the projections of the object structures superpose through the projector lenses to form a full image, wherein the projector lenses are printed by means of transparent ink from a plurality of droplets which, in their liquid state, join into a drop which forms a projector lens after curing, wherein the number of droplets for at least two adjacent projector lenses is different; and
curing the drops forming the projector lenses.

9. Method according to claim 8, wherein the number of droplets for printing a projector lens is determined in response to the thickness of the support.

10. Method according to claim 9, the method further comprising:
arranging a condenser lens array on the object structure array, the condenser lens array comprising a plurality of condenser lenses, wherein the condenser lenses are printed by means of a transparent ink from a plurality of droplets which, in their liquid state, join into a drop which forms a condenser lens after curing; and
curing the drops which form the condenser lenses.

11. Method according to claim 8, wherein the number of droplets for printing a projector lens is determined in response to the thickness' deviation from a desired value of the thickness of the support.

12. Method according to claim 11, the method further comprising:
arranging a condenser lens array on the object structure array, the condenser lens array comprising a plurality of condenser lenses, wherein the condenser lenses are printed by means of a transparent ink from a plurality of droplets which, in their liquid state, join into a drop which forms a condenser lens after curing; and
curing the drops which form the condenser lenses.

13. Method according to claim 8, the method further comprising:
arranging a condenser lens array on the object structure array, the condenser lens array comprising a plurality of condenser lenses, wherein the condenser lenses are printed by means of a transparent ink from a plurality of droplets which, in their liquid state, join into a drop which forms a condenser lens after curing; and
curing the drops which form the condenser lenses.

14. Method according to claim 13, wherein the transparent ink comprises a hybrid polymer.

15. Method according to claim 14, wherein the distance between a projector lens and the associated object structures corresponds to the focal length of the respective projector lens.

16. Method according to claim 15, wherein the thickness of the support is measured.

17. Method according to claim 11, wherein the thickness of the support is measured.

18. Method according to claim 9, wherein the thickness of the support is measured.

19. Method of manufacturing a microprojector, the method comprising:
providing a transparent support;
arranging an object structure array on the transparent support, the object structure array comprising a plurality of object structures;
arranging a condenser lens array on the object structure array, the condenser lens array comprising a plurality of condenser lenses, wherein the condenser lenses are printed by means of a transparent ink from a plurality of droplets which, in their liquid state, join into a drop which forms a condenser lens after curing;
curing the drops which form the condenser lenses;
arranging a projector lens array on a side of the support facing away from the object structure, wherein at least one projector lens is associated with one object structure such that the projections of the object structures superpose through the projector lenses to form a full image, wherein the projector lenses are printed by means of transparent ink from a plurality of droplets which, in their liquid state, join into a drop which forms a projector lens after curing, wherein the number of droplets for printing a projector lens is determined in response to the thickness of the support; and
curing the drops forming the projector lenses.

20. Method according to claim 19, wherein the number of droplets for printing a projector lens is determined in response to the thickness' deviation from a desired value of the thickness of the support.

21. Method according to claim 20, wherein the distance between a projector lens and the associated object structures corresponds to the focal length of the respective projector lens.

22. Method according to claim 19, wherein the transparent ink comprises a hybrid polymer.

23. Method according to claim 19, wherein the thickness of the support is measured.

24. Method according to claim 20, wherein the thickness of the support is measured.

25. Method according to claim 23, wherein the number of droplets for two adjacent projector lenses is different.

26. Method according to claim 23, wherein the distance between a projector lens and the associated object structures corresponds to the focal length of the respective projector lens.

* * * * *